(12) United States Patent
Tang et al.

(10) Patent No.: US 11,211,994 B2
(45) Date of Patent: Dec. 28, 2021

(54) ANGULAR SPARSE CHANNEL RECOVERY USING HISTORY MEASUREMENTS

(71) Applicant: Samsung Electronics Co., Ltd., Suwon-si (KR)

(72) Inventors: Yanru Tang, San Diego, CA (US); Hongbing Cheng, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/989,653

(22) Filed: Aug. 10, 2020

(65) Prior Publication Data
US 2021/0314056 A1 Oct. 7, 2021

Related U.S. Application Data

(60) Provisional application No. 63/005,863, filed on Apr. 6, 2020.

(51) Int. Cl.
*H04B 7/08* (2006.01)
*H04L 25/02* (2006.01)

(52) U.S. Cl.
CPC ......... *H04B 7/0885* (2013.01); *H04L 25/024* (2013.01); *H04L 25/025* (2013.01)

(58) Field of Classification Search
CPC ...... H04B 1/0064; H04B 1/0067; H04B 7/04; H04B 7/0408; H04B 7/0837; H04B 7/0885; H04L 25/0202; H04L 25/021; H04L 25/0222; H04L 25/024; H04L 25/025; H04L 25/0256

USPC .............. 375/260, 262, 265, 267, 341, 347; 370/329, 332, 334, 335, 341, 342
See application file for complete search history.

(56) References Cited

U.S. PATENT DOCUMENTS

| | | | |
|---|---|---|---|
| 10,594,383 B1 | 3/2020 | Orhan et al. | |
| 10,594,517 B1 | 3/2020 | Lo et al. | |
| 2003/0152099 A1* | 8/2003 | Chun | H04B 7/086 370/441 |
| 2005/0047322 A1* | 3/2005 | Sondur | H04B 7/0697 370/203 |
| 2006/0244660 A1* | 11/2006 | Ann | G06K 9/0057 342/377 |
| 2014/0334564 A1 | 11/2014 | Singh et al. | |
| 2018/0287822 A1* | 10/2018 | Wang | H04L 25/024 |

(Continued)

OTHER PUBLICATIONS

Xing Zhang et al., "Angle-of-arrival Based Beamforming for FDD Massive MIMO", ECE Department, Rice University, TX & Intel Corporation, CA, IEEE, Asilomar 2015, pp. 704-708.

*Primary Examiner* — Young T. Tse
(74) *Attorney, Agent, or Firm* — Lewis Roca Rothgerber Christie LLP (57) ABSTRACT

Compressive sensing (CS) channel recovery using history measurements. Both current and history measurements for AoAs estimation, and only use current measurement for coefficient estimation. The dominant angle of arrival (AoA) is estimated using history and current measurements. In Approach 1, the dominant AoA is invariant and the coefficients are uncorrelated. In Approach 2, the dominant AoA is invariant and the coefficients are fully correlated. The remaining AoAs are estimated. The coefficients corresponding to each estimated dominant AoA are estimated. And the channel is recovered.

20 Claims, 5 Drawing Sheets

(56) References Cited

U.S. PATENT DOCUMENTS

| | | | |
|---|---|---|---|
| 2019/0137596 A1* | 5/2019 | Silverman | H04B 7/0802 |
| 2019/0190569 A1 | 6/2019 | Nayeb Nazar et al. | |
| 2019/0349042 A1 | 11/2019 | Ramireddy et al. | |
| 2020/0136704 A1* | 4/2020 | Liu | H04B 7/0639 |
| 2020/0358512 A1* | 11/2020 | Zhan | H04B 7/0695 |
| 2020/0382346 A1* | 12/2020 | Noureddine | H04L 25/0204 |
| 2021/0067232 A1* | 3/2021 | Tang | H04B 7/0617 |

* cited by examiner

ANGULAR SPARSE CHANNEL RECOVERY USING HISTORY MEASUREMENTS

CROSS-REFERENCE TO RELATED APPLICATIONS

This application claims the benefit of U.S. Provisional Patent Application No. 63/005,863, filed on Apr. 6, 2020 in the United States Patent and Trademark Office, the entire contents of which are herein incorporated by reference.

FIELD

The present disclosure is generally related to wireless communication systems. In particular, the present disclosure is related to a systems and methods for angular sparse channel recovery in hybrid beamforming systems.

BACKGROUND

Hybrid beamforming is a technique that can be used to partition beamforming between the digital and radio frequency (RF) domains. Given beam sweeping measurements, a user equipment (UE) as receiver recovers the channel to derive the beamforming (BF) vector for data reception.

SUMMARY

According to one embodiment, a method of improving angle of arrival (AoA) estimation for channel recovery comprises inputting an estimate of a combined channel for a current beam sweeping period and a previous beam sweeping period, inputting a current codebook for the current beam sweeping period and a previous codebook for the previous beam sweeping period, estimating a dominant AoA, estimating remaining angles of arrival (AoAs), estimating coefficients corresponding to the estimated dominant AoA and the estimated remaining AoAs, recovering a current channel.

According to one embodiment, the dominant AoA estimation is based on history measurements and current measurements.

According to one embodiment, the current measurements are used in estimating coefficients.

According to one embodiment, the dominant AoA is estimated using an invariant AoA and uncorrelated coefficients.

According to one embodiment, $$\bar{x}_{t1} = \underset{x}{\mathrm{argmax}} \sum_{n=t-T+1}^{t} \frac{\varphi_n(x)^H Y_n Y_n^H \varphi_n(x)}{\|\varphi_n(x)\|^2},$$

$\varphi_n(x) = W_n a(x)$.

According to one embodiment, the dominant AoA is estimated using an invariant AoA and fully correlated coefficients.

According to one embodiment, $$\bar{x}_{t1} = \underset{x}{\mathrm{argmax}} \frac{\varphi_c(x)^H Y_c Y_c^H \varphi_c(x)}{\|\varphi_c(x)\|^2}, \varphi_c(x) = \begin{bmatrix} \varphi_t(x) \\ \vdots \\ \varphi_{t-T+1}(x) \end{bmatrix}, Y_c = \begin{bmatrix} Y_t \\ \vdots \\ Y_{t-T+1} \end{bmatrix}$$

According to one embodiment, the current channel is recovered using a least square channel estimator.

According to one embodiment, conditions are derived on a beam sweeping codebook where a closed form simultaneous orthogonal matching pursuit (SOMP) is applied to recover the current channel.

According to one embodiment, when the beam sweeping codebook does not satisfy the conditions, history measurements are used for estimating the dominant AoA and the remaining AoAs.

According to one embodiment, when the dominant AoA and the remaining AoAs are estimated using current measurements and history measurements, the beam sweeping codebook is updated.

According to another embodiment, a system for improving angle of arrival (AoA) estimation for channel recovery comprises a processor, and a memory storing non-transitory processor-executable instructions that, when executed by the processor, cause the processor to: input an estimate of a combined channel for a current beam sweeping period and a previous beam sweeping period, input a current codebook for the current beam sweeping period and a previous codebook for the previous beam sweeping period, estimate a dominant AoA, estimate remaining angles of arrival (AoAs), estimate coefficients corresponding to the estimated dominant AoA and the estimated remaining AoAs, recover a current channel.

According to one embodiment, the dominant AoA estimation is based on history measurements and current measurements.

According to one embodiment, the current measurements are used in estimating the coefficients corresponding to the estimated dominant AoA and the estimated remaining AoAs.

According to one embodiment, the dominant AoA is estimated using an invariant AoA and uncorrelated coefficients.

According to one embodiment, $$\bar{x}_{t1} = \underset{x}{\mathrm{argmax}} \sum_{n=t-T+1}^{t} \frac{\varphi_n(x)^H Y_n Y_n^H \varphi_n(x)}{\|\varphi_n(x)\|^2},$$

$\varphi_n(x) = W_n a(x)$.

According to one embodiment, the dominant AoA is estimated using an invariant AoA and fully correlated coefficients.

According to one embodiment, $$\bar{x}_{t1} = \underset{x}{\mathrm{argmax}} \frac{\varphi_c(x)^H Y_c Y_c^H \varphi_c(x)}{\|\varphi_c(x)\|^2}, \varphi_c(x) = \begin{bmatrix} \varphi_t(x) \\ \vdots \\ \varphi_{t-T+1}(x) \end{bmatrix}, Y_c = \begin{bmatrix} Y_t \\ \vdots \\ Y_{t-T+1} \end{bmatrix}$$

According to one embodiment, conditions are derived on a beam sweeping codebook where a closed form simultaneous orthogonal matching pursuit (SOMP) is applied to recover the current channel.

According to one embodiment, a method of improving angle of arrival (AoA) estimation for channel recovery comprises determining whether a beam sweeping codebook satisfies conditions to apply a closed form simultaneous orthogonal matching pursuit (SOMP) algorithm, when the beam sweeping codebook satisfies the conditions, estimating angles of arrival (AoAs) with the closed form SOMP, and when the beam sweeping codebook does not satisfy the conditions, estimating the AoAs with a classical SOMP algorithm.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Analog beamforming adjusts the signal phases of individual antennas signals in a radio frequency (RF) domain. In digital beamforming, the signal is pre-coded in baseband processing before RF transmission.

In hybrid beamforming with single-connection antenna arrays, analog antennas are separated into several groups and each group may be combined independently into a separated RF chain. In a single RF chain, for the receiver analog beamforming, a beam sweeping process may be performed periodically to update the beamforming vector for data reception. During the beam sweeping process, the receiver uses M different beamforming vectors, denoted by $w_i \in \mathcal{C}^{1 \times N_R}$ for i=1, ..., M, chosen from a designed codebook to combine analog signals received from $N_R$ antennas. Given combined signals, the receiver performs digital channel estimation. With $Y \in \mathcal{C}^{M \times K}$ as the estimated digital channels and $H=[h_1, \ldots, h_K] \in \mathcal{C}^{N_R \times K}$ as the actual analog channels, Y may be modeled as in Equation (1):

$$Y = WH + N \tag{1}$$

Where $$W = \begin{bmatrix} w_1 \\ \vdots \\ w_M \end{bmatrix} \in \mathcal{C}^{M \times N_R}$$

may be the beamforming codebook and $N \in \mathcal{C}^{M \times K}$ may be the digital channel estimation error. As described herein, $$N = \begin{bmatrix} n_1 \\ \vdots \\ n_M \end{bmatrix}$$

and it may be assumed that $n_m^T \sim \mathcal{C}N(0, \sigma^2 I)$, for $m=1, \ldots, M$, and that it satisfies Equation (2):

$$E[n_j^H n_k] = 0, \text{ for } 1 \leq j, k \leq M \text{ and } j \neq k \tag{2}$$

Given Y and W, the receiver recovers the analog channel H. Based on the recovered analog channels, the receiver may derive the beamforming vector using an Eigen-based single-connection analog beamforming (ESAB) algorithm to improve hybrid beamforming gain. With $f_k$ being the frequency of the kth subcarrier, for $k=1, \ldots, K$, channel $h_k$ may be modeled by Equation (3):

$$h_k = \sum_{l=1}^{L} \sum_{i=1}^{R_l} \alpha_{li} e^{j\phi_{li}} e^{-j2\pi f_k \tau_{li}} a(\theta_{li}) \tag{3}$$

The channel model in Equation (3) assumes that the channel at the kth subcarrier has L clusters and that the lth cluster contains $R_l$ rays. Each ray may be modelled using parameters angle of arrival (AoA) $\theta_{li}$, path gain $\alpha_{li}$, phase shift $\phi_{li}$, and delay $\tau_{li}$. Under the assumption of uniform linear array (ULA) with distance of half the wavelength, given $\theta$, $a(\theta) \in \mathcal{C}^{N_R}$ may be given by Equation (4):

$$a(\theta) = [e^{j\pi \cdot 0 \cdot \cos\theta}, \ldots, e^{j\pi \cdot (N_R-1) \cdot \cos\theta}]^T \tag{4}$$

Figure 1:
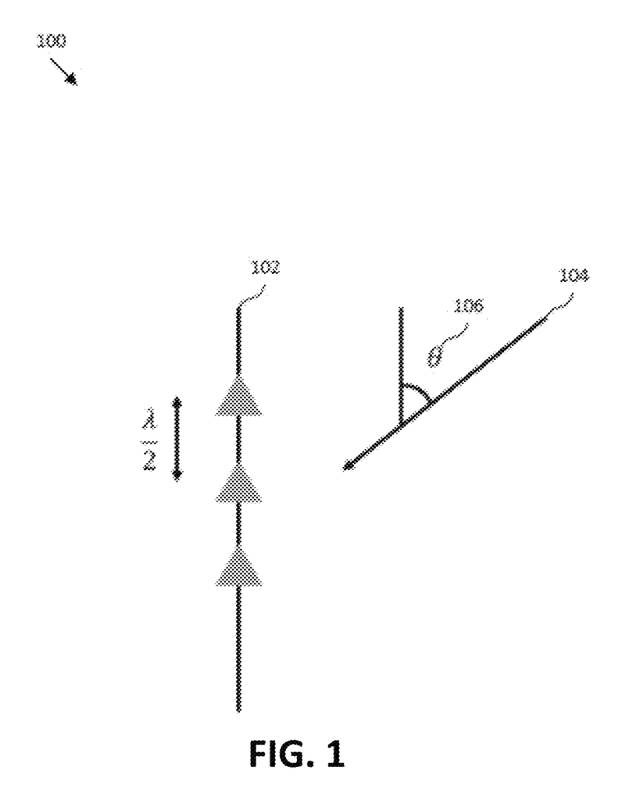
FIG. 1 illustrates a diagram of a one-dimensional antenna array and an angle of arrival (AoA) being defined, according to some embodiments.

FIG. 1 illustrates a diagram 100 of a one-dimensional antenna array and an AoA being defined. FIG. 1 shows a one-dimensional antenna array 102 receiving a signal 104 having an AoA 106.

For $\overline{\Theta} = \{\overline{\theta}_1, \ldots, \overline{\theta}_N\}$ as a set of quantized values for AoAs, and the matrix $A \in \mathcal{C}^{N_R \times N}$ may be defined as Equation (5):

$$A = [a(\overline{\theta}_1), \ldots, a(\overline{\theta}_N)], \tag{5}$$

For $n=1, \ldots, N$, the $\overline{\theta}_n$ are defined as Equation (6):

$$x_n = \pi \cos(\overline{\theta}_n) = \pi \left( -1 + \frac{2}{N}(n-1) \right) \tag{6}$$

Under the assumption that the channel is sparse (the number of nonzero elements is smaller than the total number of elements) in the angle domain, if the AoA is quantized finely enough, then it may be possible to approximate H by $H \approx AS$ for some coefficient matrix $S = [s_1, \ldots, s_K] \in \mathcal{C}^{N \times K}$ satisfying Equation (7):

$$\|S\|_0 \leq \overline{L} \text{ with } \overline{L} \ll N \tag{7}$$

Where $\|S\|_0$ is the number of nonzero rows of S and $\overline{L}$ is some known parameter that determines the number of angles involved in channel approximation. Given $\overline{L}$, the maximum likelihood (ML) estimator for H can be derived from Equation (8):

$$\min_{S} \|Y - \Phi S\|_F; \text{ s.t. } \|S\|_0 \leq \overline{L} \tag{8}$$

Where, as in Equation (9):

$$\Phi = [\varphi(\overline{x}_1), \ldots, \varphi(\overline{x}_N)] = WA, \varphi(\overline{x}_i) = Wa(\overline{x}_i), \text{ for } i=1, \ldots, N \tag{9}$$

Under the $l_0$ constraint, it may be possible to approximate the channel using no more than $\overline{L}$ angles chosen from the quantized set. With $S^*$ being the solution to the above optimization problem, the channel H can be estimated as in Equation (10):

$$\hat{H} = AS^* \tag{10}$$

According to one embodiment, the present system and method includes using an partial identity codebook in a general case or uniform discrete Fourier transform (DFT) codebook if $N_R$ is integer multiples of M. The partial identity codebook includes the first M rows of an identity matrix of size $N_R \times N_R$. Under such codebooks, the present system and method may include a closed-form simultaneous orthogonal matching pursuit (SOMP) method to reduce complexity.

Denote $$J - 1 = \left\lfloor \frac{N_R}{M} \right\rfloor,$$

$R = N_R - M(J-1)$. Wherein:

$$W = [W_1 \ldots W_{J-1} W_J]$$

Where $W_j \in \mathcal{C}^{M \times M}$, for $j=1, \ldots J-1$ and $W_J \in \mathcal{C}^{M \times R}$ $0 \leq R < M$. For each $W_j$, for $j=1, \ldots J-1$, write $W_j = [W_{j1} W_{j2}]$, where $W_{j1} \in \mathcal{C}^{M \times R}, W_{j2} \in \mathcal{C}^{M \times (M-R)}$.

The necessary and sufficient conditions on beamforming codebook W to apply closed form SOMP are given by $$WW^H = C_0 I$$

$$W_n W_l^H = C_{nl} I, n \neq l, n, l == 1, \ldots J-1$$

$$W_{n1} W_j^H = 0, n = 1, \ldots J-1$$

Then there exists a set of mutually orthogonal bases, denoted by: $\varphi(x_1), \ldots, \varphi(x_M)$, with $$x_m = x_1 + \frac{2\pi}{M}(m-1),$$

$m = 2 \ldots M$ and $\|\varphi(x_i)\|^2 = \|\varphi(x_j)\|^2$, $\forall i, j$.

For the identity codebook, $C_j = 0$ for $j > 1$ and $N_R$ does not have to be integer multiples of M. The identity codebook may be given as follows:

$$W_{IDT} = [I_{M \times M} O_{M \times (N_R - M)}]$$

Uniform discrete Fourier transform (DFT) codebooks with arbitrary offset $b_1$ may also satisfy $W_1 W_1^H = I_{M \times M}$ and $W_j = C_j W_1$ for some constant $C_j$, $$j = 1, \ldots, J = \frac{N_R}{M},$$

with $C_j = e^{j(i-1)Mb_1}$ for $$j = 2, \ldots, \frac{N_R}{M}.$$

In this case, $N_R/M$ is an integer. The uniform DFT codebook may be given as follows:

$$W_{DFT} = \begin{bmatrix} a(b_1)^H \\ \vdots \\ a(b_M)^H \end{bmatrix}, b_i = b_1 + \frac{2\pi}{M}(i-1) \text{ for } i = 2, \ldots, M, \forall b_1$$

If W satisfies $W_1 W_1^H = I_{M \times M}$ and $W_j = C_j W_1$ for some constant $C_i, j = 1, \ldots,$ $$J = \frac{N_R}{M},$$

once the dominant AoA $\tilde{x}_1$ is known, to guarantee basis orthogonality, the remaining AoAs may be given by $$\tilde{x}_i = \tilde{x}_1 + \frac{2\pi}{M}(i-1),$$

$i=2, \ldots, M$ regardless of W.

Figure 2:
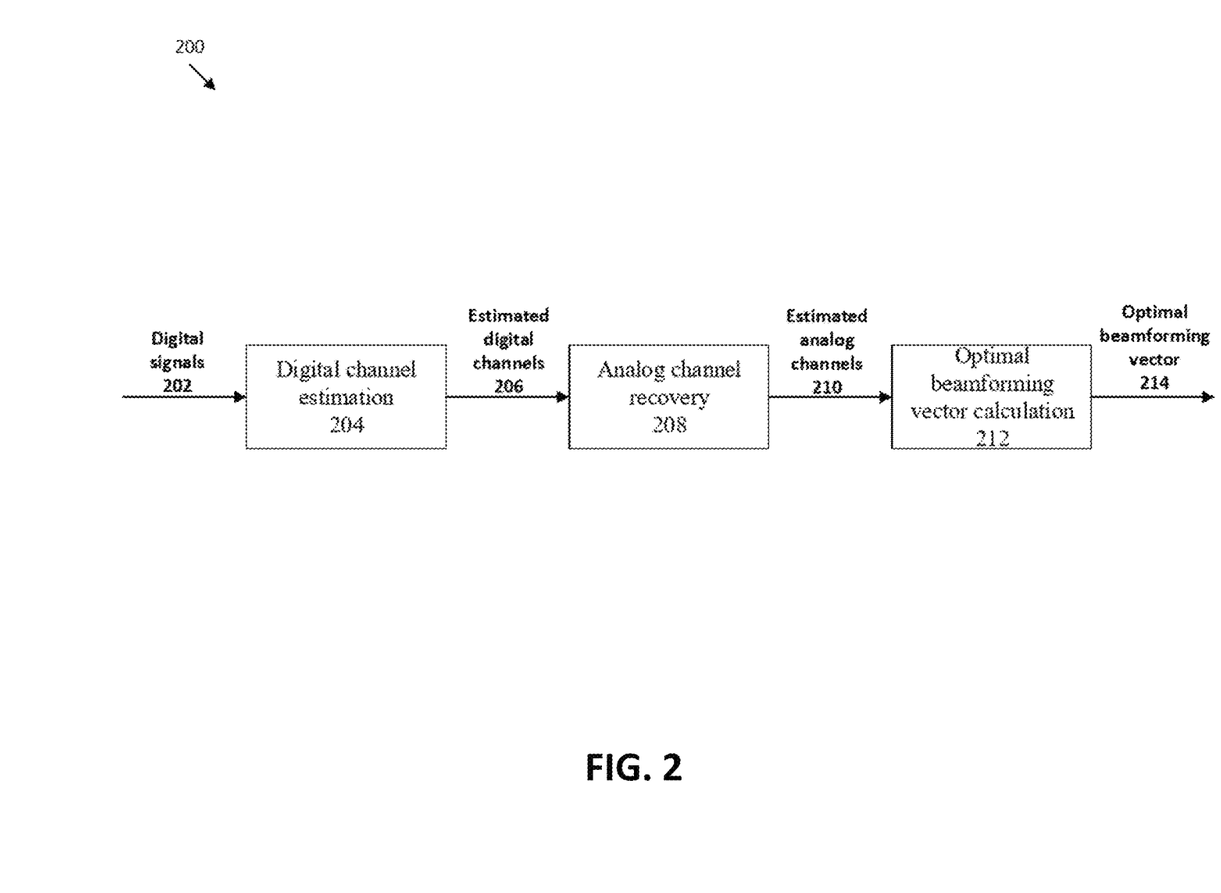
FIG. 2 illustrates a block diagram for the present receiver, where analog beamforming is performed, according to some embodiments.

Turning to FIG. 2, FIG. 2 illustrates a block diagram 200 of a process where analog beamforming is performed, according to one embodiment. The system performs the beam sweeping process periodically to update its analog beam. Given the digital signals 202, the system performs digital channel estimation at 204 followed by analog channel recovery at 208 based on the estimated digital channels 206. Based on the estimated analog channels 210, the system generates the beamforming vector at 212 using the Eigen-based single-connection analog beamforming (ESAB) algorithm to improve hybrid beamforming gain, and produces the beamforming vector 214.

Figure 3:
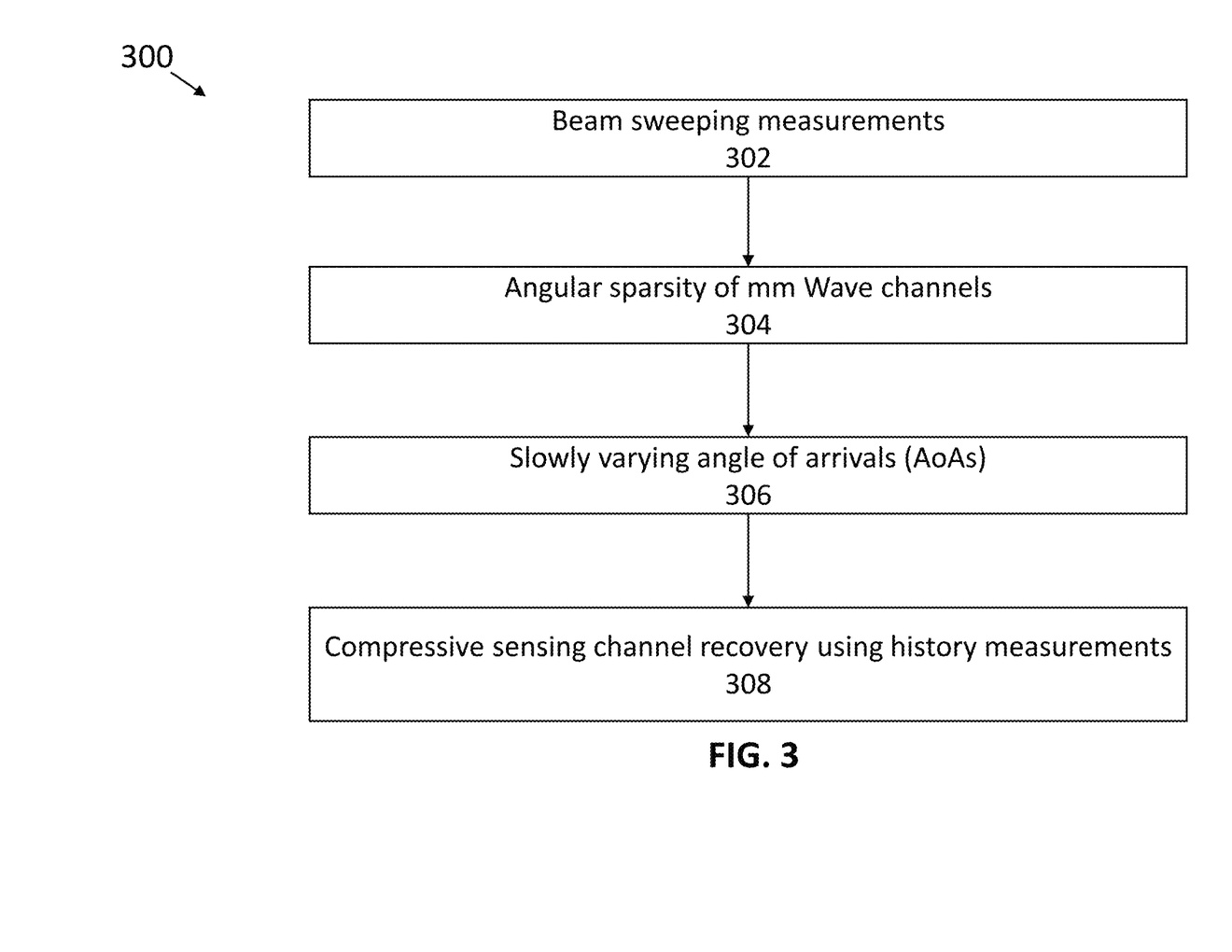
FIG. 3 illustrates a flowchart in a method for analog channel recovery, according to an embodiment.

Turning now to FIG. 3, FIG. 3 illustrates a method 300 of hybrid beamforming in millimeter (mm) Wave communications. Hybrid beamforming (BF) may be adopted to balance performance and cost. Beam sweeping may be done at the user equipment (UE) or base station (BS) to combat poor link budget. At 302, beam sweeping measurements may be taken at the user equipment or base station. At 304, the UE or BS identifies angular sparsity of the mm Wave channels. At 306, the base station or UE identifies slowly varying angle of arrivals (AoAs). Then at 308, the base station or UE implements compressive sensing (CS) channel recovery using history measurements.

Compressive sampling may be a signal processing technique for efficiently acquiring and reconstructing a signal, by finding solutions to underdetermined linear systems. This is based on the principle that, through optimization, the sparsity of a signal can be exploited to recover it from far fewer samples than required by the Nyquist-Shannon sampling theorem. There may be two conditions under which recovery may be possible. The first one may be sparsity, which requires the signal to be sparse in some domain. The second one may be incoherence, which is applied through the isometric property, which is sufficient for sparse signals.

Figure 4:
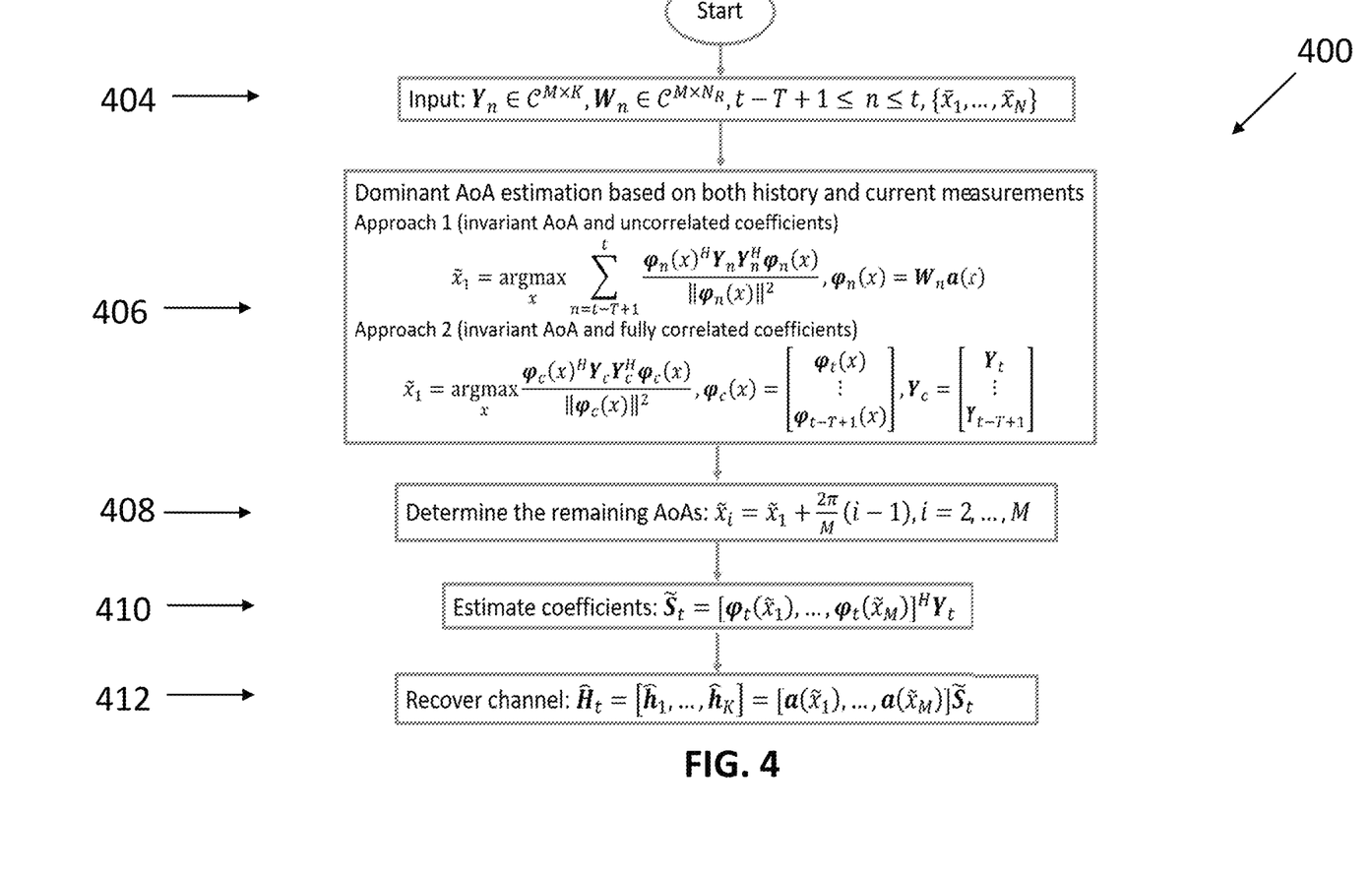
FIG. 4 illustrates a flowchart in another method for analog channel recovery, according to an embodiment.

Turning now to FIG. 4, FIG. 4 discloses a method 400 for channel recovery. At 404, the following conditions may be given. The UE may assume M beam sweeping symbols, $N_R > M$ antenna per RF chain, K subcarriers. Measurements in the t-th beam sweeping period may be as follows:

$$Y_t = W_t H_t + N_t$$

$W_t \in \mathcal{C}^{M \times N_R}$: beam sweeping codebook,
$H_t \in \mathcal{C}^{N_R \times K}$: unknown channel
$Y_t \in \mathcal{C}^{M \times K}$: estimate of combined channel $W_t H_t$
$N_t \in \mathcal{C}^{M \times K}$: combined channel estimation error At time t, the UE has access to $W_{t-j} \in \mathcal{C}^{M \times N_R}, Y_{t-j} \in \mathcal{C}^{M \times K}$, $j=0, \ldots, T-1$ $(T-1) \geq 1$ history measurements: $W_{t-j}, Y_{t-j}, j=1, \ldots, T-1$.
1 current measurement: $W_t, Y_t$ The UE may assume that channel AoAs change slowly over T beam sweeping periods. Given both current and history measurements, the UE may recover $H_t \in \mathcal{C}^{N_R \times K}$ such that one beamforming (BF) vector for data reception can be derived accordingly.

Method 400 may start with input $W_n$ and $Y_n$, $t-T+1 \leq n \leq t$, $\{\tilde{x}_1, \ldots, \tilde{x}_N\}$ $Y_n$ may be input into a modified SOMP as follows:
1. Estimate dominant AoA $\tilde{x}_{t1}$
2. Determine (M−1) AoAs:

$$\tilde{x}_{tm} = \tilde{x}_{t1} + \frac{2\pi}{M}(m-1),$$

m=2, ..., M
3. Estimate coefficients $$\tilde{S}_t = [\varphi(\tilde{x}_1), \ldots, \varphi(\tilde{x}_M)]^H Y_t \in \mathcal{C}^{M \times K}$$

4. Recover the channel $$\hat{H} = [\hat{h}_1, \ldots, \hat{h}_K] = [a(\tilde{x}_1), \ldots, a(\tilde{x}_M)] \tilde{S}_t$$

At 406, there are various ways in which history information may be used if $W_n$ and $Y_n, t-T+1 \leq n \leq t$ are available. History and current measurements may be used for AoAs estimation, while estimate corresponding coefficients may be based on current measurements. The UE may use two approaches to estimate the dominant AoA.

In Approach 1, the AoA may be invariant and coefficients may be uncorrelated. Given $W_n$ and $Y_n, t-T+1 \leq n \leq t$, it is assumed that channel $H_n$, $t-T+1 \leq n \leq t$, consists of the same set of AoAs, but the corresponding coefficients may be fully uncorrelated. Under this assumption, the dominant AoA may be determined by solving the following optimization problem:

$$\tilde{x}_{t1} = \underset{x}{\operatorname{argmax}} \sum_{n=t-T+1}^{t} \|Y_n - W_n a(x) s_n\|^2 = \quad (16)$$

$$\underset{x}{\operatorname{argmax}} \sum_{n=t-T+1}^{t} \frac{\varphi_n(x)^H Y_n Y_n^H \varphi_n(x)}{\|\varphi_n(x)\|^2}$$

Where $$\varphi_t(x) = W_t a(x) \in \mathcal{C}^M, a(x) = [e^{j0x}, \ldots e^{j(N_R-1)x}]^T \in \mathcal{C}^{N_R} \quad (17)$$

Once the dominant AoA $\tilde{x}e_{t1}$ is estimated, analog channel $H_t$ may be recovered according to closed form SOMP algorithm.

In Approach 2, the AoA may be invariant and the coefficients may be fully correlated. Given $Y_n, t-T+1 \leq n \leq t$ and channel $H_n, t-T+1 \leq n \leq t$, for $\tilde{x}_{t1}$ estimation, it may be assumed that the channel stays invariant, including both AoAs and coefficients, during past T beam sweeping periods. Under this assumption, $\tilde{x}_{t1}$ may be estimated by:

$$\tilde{x}_{t1} = \underset{x}{\mathrm{argmax}} \sum_{n=t-T+1}^{t} \|Y_n - W_n a(x)s\|^2 = \underset{x}{\mathrm{argmax}} \frac{\varphi_c(x)^H Y_c Y_c^H \varphi_c(x)}{\|\varphi_c(x)\|^2} \quad (18)$$

where $$\varphi_c(x) = \begin{bmatrix} \varphi_t(x) \\ \vdots \\ \varphi_{t-T+1}(x) \end{bmatrix}, Y_c = \begin{bmatrix} Y_t \\ \vdots \\ Y_{t-T+1} \end{bmatrix} \quad (19)$$

In Approach 2, when channel variation is relatively small during T beam sweeping periods, the current channel may be recovered using a least square channel estimator. To better exploit history measurements, the UE may chose codebooks appropriately to improve the AoAs estimation accuracy.

At 408, the UE may determine or estimate the remaining AoAs according to $$\tilde{x}_i = \tilde{x}_1 + \frac{2\pi}{M}(i-1),$$

$i = 2, \ldots, M$. This may be done to insure pairwise orthogonality of all selected bases.

At 410, the coefficients for each estimated AoA may be estimated by the UE as follows: $\tilde{S} = [\varphi(\tilde{x}_1), \ldots, \varphi(\tilde{x}_M)]^H Y_t \in \mathcal{C}^{M \times K}$. To best exploit history measurements, it may be desirable to choose beam sweeping codebooks, $W_t$ and $W_{t-j}$, such that $W_t W_{t-j}^H = 0$. For example, $M=2, N_R=4, T=2$, the UE may chose $$W_t = \begin{bmatrix} 1 & 1 & 0 & 0 \\ 1 & -1 & 0 & 0 \end{bmatrix}$$

for t even and $$W_t = \begin{bmatrix} 0 & 0 & 1 & 1 \\ 0 & 0 & 1 & -1 \end{bmatrix}$$

for t odd.

To apply closed form SOMP, necessary and sufficient conditions (NASCs) on W are derived as follows:
Let $$J = \left\lfloor \frac{N_R}{M} \right\rfloor + 1,$$

$R = N_R - M(J-1)$. Write $W = [W_1 \ldots W_{J-1} W_J]$

1. $W_j \in \mathcal{C}^{M \times M}, j=1, \ldots, J-1,$
2. $W_J = [W_{j1} W_{j2}], W_{j1} \in \mathcal{C}^{M \times R}, W_{j1} \in \mathcal{C}^{M \times (M-R)}$
3. $W_J \in \mathcal{C}^{M \times R}$ Necessary and sufficient conditions (NASCs) may be given by:

1. $WW^H = c_0 I.$
2. $W_L W_n^H = c_{ln} I, l, n=1, \ldots, J-1, l \neq n$
3. $W_{n1} W_j^H = 0, n=1, \ldots, J-1$ If some $W_j, j=1, \ldots j-1$, is invertible, then NASCs reduce to 1. $WW^H = c_0 I$
2. $W_n C_n W_j, n=1, \ldots, J-1$
3. $W_J = 0$ There may be little performance gain in using history information when codebook is fixed for all beam sweeping periods. To better exploit history information, different designs of beamforming codebooks may be considered.

For beam sweeping, the UE may use all codewords chosen from a complete codebook. The complete codebook may be defined as $C \in \mathcal{C}^{N_R \times N_R}$, satisfying $CC^H = I$. In the n-th beam sweeping period, the beamforming codebook $W_n$ may be chosen as follows:

$$W_n C([i_n:j_n],:), i_n = (1+(n-1)M) \bmod N_R, j_n = (nM) \bmod N_R \quad (21)$$

Under Equation 21, all codewords in C (each row of C may be a codeword) should be covered after $$T = \left\lceil \frac{N_R}{M} \right\rceil$$

beam sweeping periods. In the meantime, it is assumed that, at time t the UE has access to $Y_n$ and $W_n$, $n=t, t-1, \ldots t-T+1$, which will be used to estimate dominant AoA according to either Equation 16 or Equation 18.

When using closed form SOMP with history measurements, the UE may determine the beamforming codebook according to the following:

We define complete codebook as $C \in \mathcal{C}^{N_R \times N_R}$, satisfying $CC^H = I$. In the n-th beam sweeping period, the beamforming codebook $W_n$ may be chosen according to Equation 21

Under Equation 21, all codewords in C (each row of C may be a codeword) should be covered after $$T = \left\lceil \frac{N_R}{M} \right\rceil$$

beam sweeping periods. In the meantime, it is assumed that, at time t, the UE has access to $Y_n$ and $W_n$, $n=t, t-1, \ldots t-T+1$, which may be used to estimate dominant AoA according to either approach 1 or approach 2 above.

When estimating the dominant AoA according to Approach 1 or Approach 2, and recovering the channel according to a closed form SOMP algorithm, the beamforming vector for data reception may be derived using an Eigen-based single-connection analog beamforming (ESAB) algorithm.

Note that the purpose of using identity codebook may be to estimate channels associated with the first two antennas. This can also be achieved by using the following codebook:

$$W = \begin{bmatrix} 1 & 1 & 0 & 0 \\ 1 & -1 & 0 & 0 \end{bmatrix} \quad (27)$$

To better use history information, for even numbered beam sweeping period, the UE may use Equation (27) as the beamforming codebook. For odd numbered beam sweeping period, the UE may use:

$$W = \begin{bmatrix} 0 & 0 & 1 & 1 \\ 0 & 0 & 1 & -1 \end{bmatrix} \quad (28)$$

as the beamforming codebook to estimate channels associated with the last two antennas.

From implementation point of view, codebook Equation (27) may be used to replace the identity codebook.

At 412, the UE may recover the channel according to estimated AoAs at 406, 408 and estimated coefficients at 410 as follows:

$$\hat{H}_t = [\hat{h}_1, \ldots, \hat{h}_K] = [a(\tilde{x}_1), \ldots, a(\tilde{x}_M)]\tilde{S}_t$$

Figure 5:
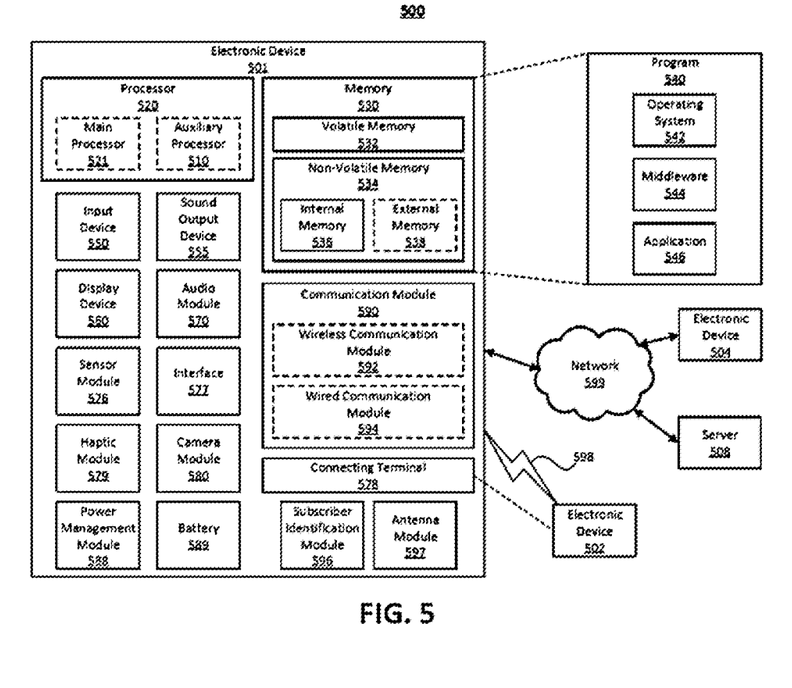
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with another electronic device 502 via a first network 598 (e.g., a short-range wireless communication network), or another electronic device 504 or a server 508 via a second network 599 (e.g., a long-range wireless communication network). The electronic device 501 may also communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 510 (e.g., a graphics processing unit (GPU), an image signal processor (ISP), a sensor hub processor, or a communication processor (CP)) that may be operable independently from, or in conjunction with, the main processor 521. Additionally or alternatively, the auxiliary processor 510 may be adapted to consume less power than the main processor 521, or execute a particular function. The auxiliary processor 510 may be implemented as being separate from, or a part of, the main processor 521.

The auxiliary processor 510 may control at least some of the functions or states related to at least one component (e.g., the display device 560, the sensor module 576, or the communication module 590) among the components of the electronic device 501, instead of the main processor 521 while the main processor 521 may be in an inactive (e.g., sleep) state, or together with the main processor 521 while the main processor 521 may be in an active state (e.g., executing an application). According to one embodiment, the auxiliary processor 510 (e.g., an image signal processor or a communication processor) may be implemented as part of another component (e.g., the camera module 580 or the communication module 590) functionally related to the auxiliary processor 510.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which may be not rechargeable, a secondary cell which may be rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or server 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that may be readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium may be a tangible device, and does not include a signal (e.g., an electromagnetic wave), but this term does not differentiate between where data may be semi-permanently stored in the storage medium and where the data may be temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of improving angle of arrival (AoA) estimation for channel recovery, the method comprising:
    inputting an estimate of a combined channel for a current beam sweeping period and a previous beam sweeping period;
    inputting a current codebook for the current beam sweeping period and a previous codebook for the previous beam sweeping period;
    estimating a dominant AoA;
    estimating remaining angles of arrival (AoAs);
    estimating coefficients corresponding to the estimated dominant AoA and the estimated remaining AoAs; and
    recovering a current channel.

2. The method of claim 1, wherein the dominant AoA estimation is based on history measurements and current measurements.

3. The method of claim 2, wherein the current measurements are used in estimating the coefficients.

4. The method of claim 1, wherein the dominant AoA is estimated using an invariant AoA and uncorrelated coefficients.

5. The method of claim 4, wherein $$\tilde{x}_{t1} = \underset{x}{\operatorname{argmax}} \sum_{n=t-T+1}^{t} \frac{\varphi_n(x)^H Y_n Y_n^H \varphi_n(x)}{\|\varphi_n(x)\|^2},$$

$\varphi_n(x)=W_n a(x)$, wherein $\tilde{x}_{t1}$ is the dominant AoA, x is the invariant AoA, $\varphi_n(x)^H$ is a matrix Hermitian (H) basis corresponding to x in an nth beam sweeping period, $Y_n$ is an estimated digital channel for the nth beam sweeping period, $W_n$ is a beam sweeping codebook in the nth beam sweeping period, t is a beginning beam sweeping period, T a total number of beam sweeping periods, and a(x) is an antenna response vector corresponding to x.

6. The method of claim 1, wherein the dominant AoA is estimated using an invariant AoA and fully correlated coefficients.

7. The method of claim 6, wherein $$\tilde{x}_{t1} = \underset{x}{\operatorname{argmax}} \frac{\varphi_c(x)^H Y_c Y_c^H \varphi_c(x)}{\|\varphi_c(x)\|^2}, \varphi_c(x) = \begin{bmatrix} \varphi_t(x) \\ \vdots \\ \varphi_{t-T+1}(x) \end{bmatrix}, Y_c = \begin{bmatrix} Y_t \\ \vdots \\ Y_{t-T+1} \end{bmatrix},$$

wherein $\tilde{x}_{t1}$ is the dominant AoA, x is the invariant AoA, $\varphi_C(x)$ is a matrix Hermitian (H) combination of basis corresponding to x for different beam sweeping periods, $Y_C$ is a combination of estimated digital channels for the different beam sweeping periods, t is a beginning beam sweeping period, and T is a total number of beam sweeping periods.

8. The method of claim 1, wherein the current channel is recovered using a least square channel estimator.

9. The method of claim 1, wherein conditions are derived on a beam sweeping codebook where a closed form simultaneous orthogonal matching pursuit (SOMP) is applied to recover the current channel.

10. The method of claim 9, wherein when the beam sweeping codebook does not satisfy the conditions, history measurements are used for estimating the dominant AoA and the remaining AoAs.

11. The method of claim 9, wherein when the dominant AoA and the remaining AoAs are estimated using current measurements and history measurements, the beam sweeping codebook is updated.

12. A system for improving angle of arrival (AoA) estimation for channel recovery, comprising:
    a processor; and
    a memory storing non-transitory processor-executable instructions that, when executed by the processor, cause the processor to:
        input an estimate of a combined channel for a current beam sweeping period and a previous beam sweeping period;
        input a current codebook for the current beam sweeping period and a previous codebook for the previous beam sweeping period;
        estimate a dominant AoA;
        estimate remaining angles of arrival (AoAs);
        estimate coefficients corresponding to the estimated dominant AoA and the estimated remaining AoAs; and
        recover a current channel.

13. The system of claim 12, wherein the dominant AoA estimation is based on history measurements and current measurements.

14. The system of claim 13, wherein the current measurements are used in estimating the coefficients corresponding to the estimated dominant AoA and the estimated remaining AoAs.

15. The system of claim 12, wherein the dominant AoA is estimated using an invariant AoA and uncorrelated coefficients.

16. The system of claim 15, wherein $$\tilde{x}_{t1} = \underset{x}{\operatorname{argmax}} \sum_{n=t-T+1}^{t} \frac{\varphi_n(x)^H Y_n Y_n^H \varphi_n(x)}{\|\varphi_n(x)\|^2},$$

$\varphi_n(x) = W_n a(x)$, wherein $\tilde{x}_{t1}$ is the dominant AoA, x is the invariant AoA, $\varphi_n(x)^H$ is a matrix Hermitian (H) basis corresponding to x in an nth beam sweeping period, $Y_n$ is an estimated digital channel for the nth beam sweeping period, $W_n$ is a beam sweeping codebook in the nth beam sweeping period, t is a beginning beam sweeping period, T a total number of beam sweeping periods, and a(x) is an antenna response vector corresponding to x.

17. The system of claim 12, wherein the dominant AoA is estimated using an invariant AoA and fully correlated coefficients.

18. The system of claim 17, wherein $$\tilde{x}_{t1} = \underset{x}{\operatorname{argmax}} \frac{\varphi_c(x)^H Y_c Y_c^H \varphi_c(x)}{\|\varphi_c(x)\|^2}, \varphi_c(x) = \begin{bmatrix} \varphi_t(x) \\ \vdots \\ \varphi_{t-T+1}(x) \end{bmatrix}, Y_c = \begin{bmatrix} Y_t \\ \vdots \\ Y_{t-T+1} \end{bmatrix},$$

wherein $\tilde{x}_{t1}$ is the dominant AoA, x is the invariant AoA, $\varphi_C(x)$ is a matrix Hermitian (H) combination of basis corresponding to x for different beam sweeping periods, $Y_C$ is a combination of estimated digital channels for the different beam sweeping periods, t is a beginning beam sweeping period, and T is a total number of beam sweeping periods.

19. The system of claim 17, wherein conditions are derived on a beam sweeping codebook where a closed form simultaneous orthogonal matching pursuit (SOMP) is applied to recover the current channel.

20. A method of improving angle of arrival (AoA) estimation for channel recovery, the method comprising:
   determining whether a beam sweeping codebook satisfies conditions to apply a closed form simultaneous orthogonal matching pursuit (SOMP) algorithm;
   when the beam sweeping codebook satisfies the conditions, estimating angles of arrival (AoAs) with the closed form SOMP algorithm;
   when the beam sweeping codebook does not satisfy the conditions, estimating the AoAs with a classical SOMP algorithm; and
   recovering a current channel.

* * * * *